United States Patent [19]

Anderson et al.

[11] 4,428,393

[45] Jan. 31, 1984

[54] QUICK VENT RESPONSE VALVE

[75] Inventors: Patrick J. Anderson, Batavia; Andrew A. Kenny, Roselle, both of Ill.

[73] Assignee: Eaton Corporation, Cleveland, Ohio

[21] Appl. No.: 349,741

[22] Filed: Feb. 18, 1982

[51] Int. Cl.[3] .............................................. F16K 17/02

[52] U.S. Cl. .............................. 137/117; 137/DIG. 8

[58] Field of Search ............... 137/117, 217, 218, 102, 137/116.3, 87, DIG. 8; 60/290

[56] References Cited

U.S. PATENT DOCUMENTS 2,209,189 7/1940 Callejo ................................ 137/218

3,606,909 9/1971 Kowalski et al. ................ 137/116.3

4,303,095 12/1981 Aubel et al. ....................... 137/493.8

*Primary Examiner*—Martin P. Schwadron

*Assistant Examiner*—James R. Shay

*Attorney, Agent, or Firm*—C. H. Grace; J. G. Lewis; R. A. Johnston

[57] ABSTRACT

A quick vent response valve (12) is fluidically series connected between a vacuum regulator valve (14) and an exhaust gas recirculation valve (16) which comprises a fluid pressure control system (10). The quick response valve operates to vent the system more quickly than if the system were vented through the vacuum regulator valve itself by employing the modulated control signal from the vacuum regulator valve as a pilot signal. The quick response valve improves response time of the vacuum system when venting from a high to a low vacuum level by momentarily displacing a valve element (56) disposed within a housing (18) to establish a nonrestricting flow path to atmosphere.

14 Claims, 3 Drawing Figures

Fig. 1.
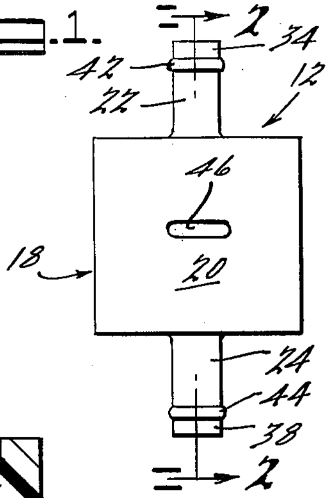
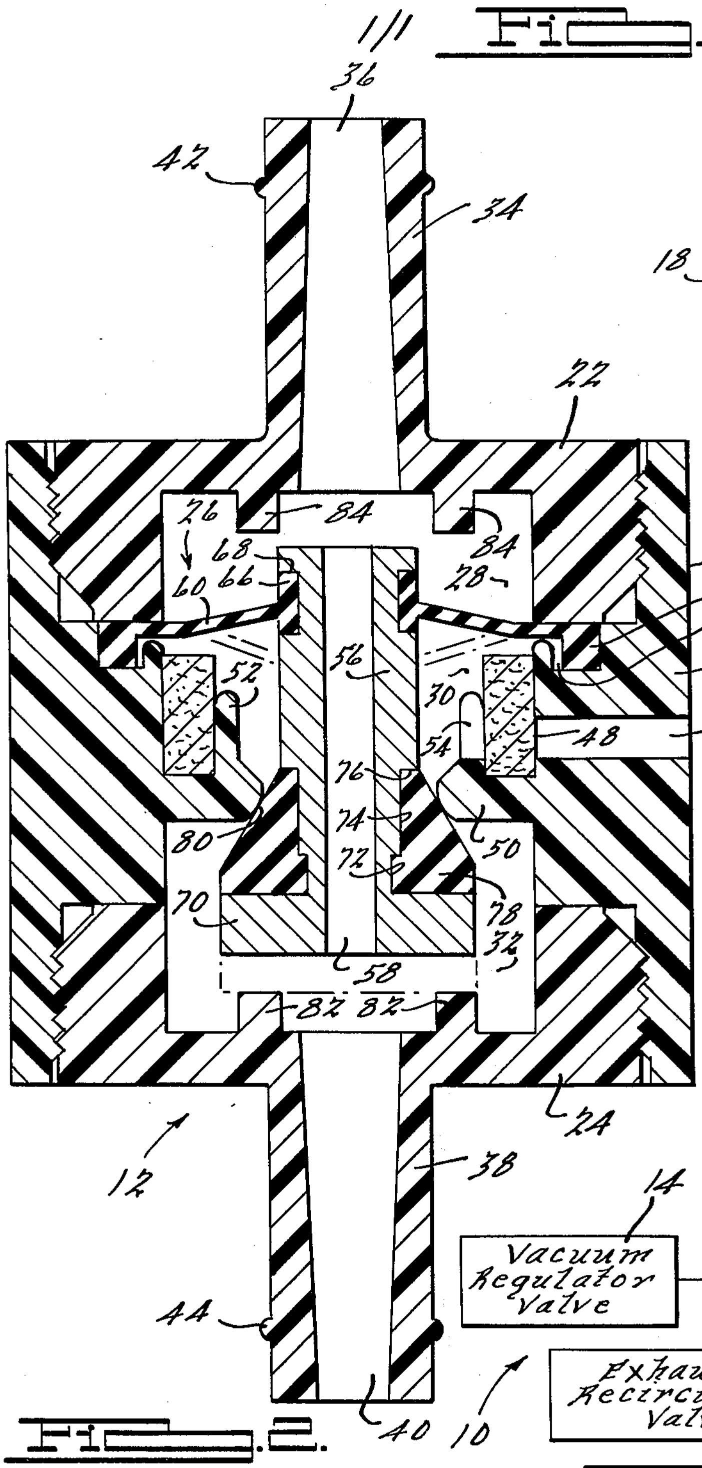
Fig. 2.
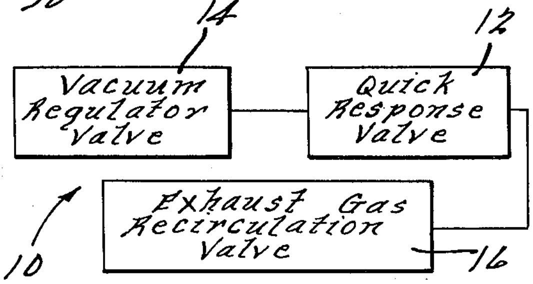
Fig. 3.

QUICK VENT RESPONSE VALVE

INTRODUCTION

The present invention relates to fluid pressure control systems comprising an intelligence modulated source of fluid pressure and an associated controlled device. More particularly, the invention relates to apparatus for improving the response time of such systems in particular critical operating modes.

BACKGROUND OF THE INVENTION

Vacuum has traditionally been a primary motive force for many control functions within motor vehicles, particularly automobiles. Although electro-mechanical actuators have displaced vacuum motors for certain functions, vacuum remains the preferred method of modulating such automotive operating perameters as ignition timing, emissions control, throttle (cruise control) position and the like.

Ever increasing complexity required to conform with governmental regulations and added vehicle features have necessitated the addition of intelligence and sophistication to certain control functions. Even long standing, standard techniques of processing vacuum signals are being reexamined to wring out heretofor acceptable operating inefficiencies and to improve response characteristics. Such prior art approaches have typically been limited to dedicated, single function devices, such as a vacuum motor for modulating an exhaust gas recirculation (EGR) valve. Where added intelligence or complex processing is required, discrete separate components are generally coupled or cascaded to achieve the required processing capability.

A net effect of the increased complexity described above is that more intelligence or information is being modulated over a medium, typically engine vacuum in an automobile, of finite capacity. This phenomenon results in a control system which processes data having ever decreasing incremental differentiation. Restated, today's control systems must be capable of accurately distinguishing and responding to smaller and smaller changes in fluid pressure (ex. engine vacuum).

As a result of the requirement of increased information processing, fluid pressure control systems often have complex fluidic systems which, themselves, can constitute a restriction to system fluid flow which, in some modes of operation, will compromise performance by increasing response time. A colorary to the restriction problem posed by complex system fluidics is the increased volume of fluid involved which, itself, can increase response time when gross or coarse adjustments to system pressure are required. Although dump valves are well-known in fluid pressure control systems, they are typically limited to rapidly changing system pressure to ambient pressure (one atmosphere) rather than in a more limited, but rapid, pressure variation. Finally, dump valves themselves are often solenoid operated and are included in a system as an ancillary branch. Such arrangements represent only a limited improvement in response time by requiring actuation by a separately generated control signal.

BRIEF DESCRIPTION OF THE INVENTION

The present invention finds particular application in enhancing the response of various control functions in the environment of a motor vehicle. According to the invention, and by way of overcoming the above described shortcomings of prior art approaches, a quick response valve is provided for inclusion in a fluid pressure control system including a source of fluid pressure and a controlled device or system of devices. The inventive valve includes source and output ports for fluid communication with the fluid source and controlled device, respectively, an atmospheric vent, a flow restricting passageway interconnecting the ports and a valve which selectively establishes a nonrestricting path of fluid communication between the output port and vent as a function of sensed fluid pressure differential between the ports. This arrangement provides the advantage of enhanced system response through the use of a source pressure signal as a pilot when partially venting the system from a high to a low level.

In the preferred embodiment of the invention, the quick response valve is employed in the control of a pneumatic device or system, wherein the fluid pressure source comprises an intelligence modulated vacuum source. This arrangement provides a system readily adaptable to applications within vehicles employing internal combustion engines having characteristic manifold vacuum.

According to another aspect of the invention, the flow restricting passageway is embodied in a valve element extending between a source fluid chamber and an output fluid chamber in substantial axial alignment with the source and output ports. This arrangement provides the advantage of simple straight through construction whereby the quick response valve can be serially interconnected within an existing pressure source-controlled device system.

According to another aspect of the invention, an atmospheric chamber is provided between the source and output chambers. The source and atmospheric chambers are petitioned by a diaphragm and the output and atmospheric chambers are petitioned by a valve seat which selectively receives a seal carried by the valve element. The diaphragm has a characteristic effective area which exceeds the effective area of the valve seal to ensure that the atmospheric vent and chamber remain pneumatically isolated from the output chamber at all times except when the system is rapidly transitioning from a high to a low vacuum level.

According to still another aspect of the invention, the area ratio of the atmospheric vent to the maximum effective area between the valve seat and seal is maintained within a predetermined optimal range. This arrangement has the advantage of minimizing response time, preventing vacuum resonance, valve element rebound and other related problems.

Various other features and advantages of this invention will be come apparent upon reading the following detailed description of the invention, which, along with the drawings, describes and discloses a preferred embodiment of the invention.

The detailed description of the disclosed embodiment makes reference to the accompanying drawings.

BRIEF DESCRIPTION OF THE DRAWINGS

FIG. 1, is a front plan view of a quick vent response valve embodying the principles of the present invention;

FIG. 2, is section view taken along lines 2—2 of FIG. 1 on an enlarged scale; and FIG. 3, is a block diagram of the preferred embodiment of the present invention within a fluid pressure control system comprising a pre-existing vacuum regulator valve and exhaust gas recirculation valve.

DETAILED DESCRIPTION OF THE PREFERRED EMBODIMENT OF THE INVENTION

Referring to FIG. 3, a block diagram of a fluid pressure control system, shown generally at 10, is illustrated. An inventive quick vent response valve 12 is series interconnected with a source of fluid pressure, illustrated as a vacuum regulator valve 14, and a controlled pneumatic device or system, illustrated as an exhaust gas recirculation (EGR) valve 16. Quick response valve 12 operates to provide controlled or limited rapid venting of control system 10 by employing a modulated vacuum signal from vacuum regulator valve 14 as a pilot signal. Quick response valve 12 effects venting faster than if system 10 were vented through vacuum regulator valve 14 itself. Specifically, when fluid pressure control system 10 is pneumatic, quick response valve 12 will improve the response time of system 10 when venting the system 10 from a high to a low vacuum level.

Although quick response valve 12 is illustrated for inclusion in a system 10 which controls an EGR valve 16, the present invention has broader application, it being understood that the detailed description is for illustrative purposes only and not to be construed as limiting. Furthermore, the present invention can be applied to various types of fluid pressure control systems in which it would receive an input signal from one or more of a number of intelligent vacuum or positive pressure sources such as an altitude compensated regulator, throttle position regulator, RPM bias regulator, coolant temperature bias regulator and the like. The devices which originate these signals are intended to be of conventional design, the details of which are deleted here for the sake of brevity.

Returning to the preferred embodiment of the invention, an example of a suitable vacuum regulator valve 14 is described in U.S. Pat. No. 4,315,521. Likewise, suitable EGR valves are described in U.S. Pat. Nos. 4,116,182 and 4,196,774. For completeness, the above referenced U.S. patents are hereby incorporated herein by reference. However, it is to be understood that they are illustrative in nature as making up a particular component of devices in a control system for a particular application, and are thus not to be considered limiting in nature. In practice, the particular complement of devices employed will vary depending upon the application intended.

Referring to FIGS. 1 and 2, quick response valve 12 has a housing shown generally at 18 composed of a generally cylindrical body portion 20 and upper and lower end closure members 22 and 24, respectively. Body portion 20 and end closure members 22 and 24 are constructed of glass filled nylon or other suitable material and are retained in their illustrated positions by adhesives, ultrasonic bonding, compressed fitting, threaded engagement or any of a number of suitable techniques well-known in the art. Body member 20 and end closure members 22 and 24 collectively define a substantially closed cavity, illustrated generally at 26, which is subdivided into a source fluid chamber 28, an atmospheric chamber 30 and an output fluid chamber 32.

Quick response valve 12 is adapted for interconnection with vacuum regulator valve 14 by the provision of a nipple 34 integrally formed with upper end closure member 22 and extending upwardly therefrom to define a source port 36. Source port 36 opens into source fluid chamber 28. Quick response valve 12 is likewise adapted for fluid communication with EGR valve 16 by the provision of a second nipple 38 integrally formed with lower end closure member 24 and depending downwardly therefrom to define an output port 40 disposed coaxially with source port 36. Output port 40 opens into output fluid chamber 32. Nipples 34 and 38 are provided with pneumatic hose retaining ribs 42 and 44, respectively, circumscribing the external surface thereof.

Atmospheric chamber 30 is in fluid communication with the atmosphere surrounding quick response valve 12 through a centrally located radially outwardly directed atmospheric vent orifice 46 within body portion 20 of housing 18. An annular filter element 48 is disposed within atmospheric chamber 30 and overlies the point at which orifice 46 enters atmospheric chamber 30 to entrap any foreign particles or the like which would otherwise enter cavity 26 and ultimately interfere with the operation of quick response valve 12. Filter element 48 is constructed of any of a number of well-known materials which would be selected as a function of the intended application for quick response valve 12 as well as the atmospheric environment to which it is to be exposed.

Filter element 48 is supported in its illustrated position by an annular petition 50 integrally formed with body portion 20 and depending radially inwardly therefrom. Petition 50 includes an upwardly extending annular rib 52 which abuts the radially inward most surface of filter element 48. Rib 52 has an area of local relief 54 in register with orifice 46 to provide for the free flow of air therethrough. Although only one orifice 46 is illustrated in the preferred embodiment of the invention, it is contemplated that more could be included at circumferentially spaced points about atmospheric chamber 30 within body portion 20. Additionally, orifice 46 is illustrated as an elongated slot. However, it is contemplated that the shape and effective cross-sectional area of orifice 46 can be altered, based upon empirical data and the intended application, without departing from the spirit of the present invention. Any atmospheric vent orifice however, should emerge within atmospheric chamber 30 adjacent the radially outward most surface of filter element 48.

An elongated valve pin or element 56 is disposed within cavity 26 and extends between source chamber 28 and output chamber 32. Valve element 56 includes an axial bore 58 establishing a bleed orifice or flow restricting passageway between chambers 28 and 32. Bore 58 is in substantial axial register with ports 36 and 40. The effective cross-sectional area of bore 58 is empirically derived and will depend upon the valving inside vacuum regulator valve 14. Valve element 56 is constructed of aluminum, glass filled nylon or other suitable material.

An annular rubber diaphragm 60 is disposed within cavity 26 and provides a partition between source chamber 28 and atmospheric chamber 30. Diaphragm 60 has a circumferential bead 62 formed about the radially outward most extent thereof. Bead 62 is received within an upwardly opening annular notch 64 formed in body portion 20 and is retained therein by the lowermost surface of upper end closure member 22. This arrangement provides a seal as well as structural retention of diaphragm 60. The radially inward most portion of diaphragm 60 includes a second integrally formed bead 66 which is received within a radially outwardly opening annular notch 68 formed near the uppermost end of valve element 56. Diaphragm 60 tends to retain valve element 56 radially in its illustrated position while permitting limited unrestricted axial displacement.

The lowermost portion of valve element 56 includes a radially outwardly directed flange portion 70. Valve element 56 defines a first area of decreased diameter 72 on its outer surface immediately above flange portion 70 and a second area of decreased diameter 74 immediately above area of decreased diameter 72. The uppermost extent of area of decreased diameter 74 forms a step 76 where it transitions into the upper portion of valve element 56. Flange portion 70, areas of decreased diameter 72 and 74 and step 76 coact to define a radially outwardly opening stepped cavity for receiving an annular seal 78. The radially outward most surface of seal 78 is conical in shape, converging in the upward direction. The radially inward most extent of petition 50 defines an annular valve seat 80 which, with valve element 56 in its illustrated position, engages the conical surface of seal 78 to establish an airtight interface therebetween.

Valve element 56, including bead 66 of diaphragm 60 and seal 78, is axially displaceable from a first or upward limit of travel (illustrated) to a second or downward limit of travel (in phantom). Seal 78 limits the upward displacement of valve element 56 in contacting valve seat 80. The downward limit of travel is established by two or more valve stops 82 integrally formed with and depending upwardly from the central portion of lower end closure member 24. Seal 78 is constructed of rubber or other suitable material molded or bonded upon valve element 56 for securing engagement therewith. An identical set of stops 84 integrally depend downwardly from upper end closure member 22. Stops 84 serve no direct function but are provided to render upper end closure member 22 identical to lower end closure member 24 to facilitate the molding thereof and the subsequent assembly of quick response valve 12.

With valve element 56 in its illustrated position, atmospheric chamber 30 is pneumatically isolated from source chamber 28 by diaphragm 60 and from output chamber 32 by the combination of petition 50 and seal 78. When valve element 56 is displaced downwardly to its second position or limit of travel, seal 78 is displaced from valve seat 80. This separation establishes a flow path between atmospheric chamber 30 and output chamber 32.

OPERATION

Quick response valve 12 operates as follows: During "normal" periods of operation in which the vacuum signal received from vacuum regulator valve 14 is either increasing, or decreasing at a relatively slow rate, the received signal will be throughput to control the EGR valve 16 in a normal manner well-known in the art. Diaphragm 60 is dimensioned to have a characteristic effective area acted upon by pressurized fluid (vacuum) within source chamber 28 which exceeds the effective area of seal 78 acted upon by the fluid pressure (vacuum) within output chamber 32. This relationship ensures the maintenance of a resultant force urging valve member 56 upwardly to maintain sealing engagement between seal 78 and valve seat 80 during "normal" operation. During such times, quick response valve 12 will have essentially no effect upon vacuum regulator valve's 14 control of EGR valve 16.

During times in which the vacuum signal from vacuum regulator valve 14 is rapidly decreasing, the vacuum signal serves as a pilot signal which upsets the established upwardly directed resultant force on valve member 56. As the vacuum level of source chamber 28 falls, a vacuum differential between source chamber 28 and output chamber 32 occurs momentarily, urging valve element 56 and seal 78 downwardly from a valve seat 80. This establishes a path of fluid communication between atmospheric chamber 30 and output chamber 32. The vacuum system (EGR valve 16) downstream of output chamber 32 can now vent through atmospheric chamber 30 and vent orifice 46. The effective area between seat 80 and seal 78 when valve element 56 is in the second position, as well as vent orifice 46, are sized to allow quicker vent response than possible with conventional venting through the pilot signal device (vacuum regulator valve 14) alone. Flow restricting passageway 58 assures that output chamber 32 vacuum level never falls below source chamber 28 vacuum level during falling vacuum level at the source port 36.

To prevent valve element 56 from transitioning between the first position and the second position too rapidly in which flange 70 could bottom against stops 82 and rebound back toward the first position and thereby prematurely choke off venting of the system, the effective area of the valve opening (between the seal 78 and seat 80, when valve element 56 is in its second position) is designed within a ratio with the effective area of vent orifice 46 to prevent too rapid aspiration therethrough. The optimum range of ratios between the orifice (46) effective area to the valve effective area has been empirically determined to be between 0.375:1 to 2.250:1. By way of definition, the nonrestricting passageway established when valve element 56 is in its second or lowermost position is defined as a passageway which has an effective cross-sectional area producing a total pressure drop which is substantially less than that of flow restricting passageway 58.

It is to be understood that the invention has been described with reference to a specific embodiment which provides the features and advantages previously described, and that such specific embodiment is susceptible to modification, as will be apparent to those skilled in the art. For example, the vents and passageways discussed hereinabove can be varied in dimension and effective area to accomodate different applications and requirements. Also, it is contemplated that quick response valve 12 can be applied in a positive pressure pneumatic fluid pressure control system with equal success. Definitionally, "from high to low pressure" is to be interpreted in relative terms, and not absolute. That is, the expression can imply a change from high positive pressure to low positive pressure, or from high vacuum to a low vacuum. Accordingly, the foregoing is not to be construed in a limiting sense.

I claim:

1. A quick response valve comprising:

means defining a source port adapted for fluid communication with a fluid pressure source;

means defining an output port adapted for fluid communication with a controlled pneumatic device;

means defining an atomspheric vent;

means defining a flow restricting passageway fluidly interconnecting said source and output ports; and valve means operative to isolate said vent from said output port when fluid pressure within said output port exceeds fluid pressure within said source port and to establish a path of fluid communication between said output port and vent when fluid pressure within said output port is less than fluid pressure within said source port, said path of fluid communication being larger than said flow restricting passageway.

2. A quick response valve comprising:

A. housing means defining, (i) a source port adapted for fluid communication with a source of fluid pressure, (ii) an output port adapted for fluid communication with a controlled pneumatic device, (iii) a source fluid chamber in fluid communication with said source port, (iv) an output fluid chamber in fluid communication with said output port, and (v) an atmospheric vent;

B. a flow restricting passageway fluidly interconnecting said source and output fluid chambers; and C. valve means operative to pneumatically isolate said atmospheric vent from said output chamber when fluid pressure within said output chamber exceeds fluid pressure within said source chamber and to establish a path of fluid communication between said output chamber and atmospheric vent when fluid pressure within said output chamber is less than fluid pressure within said source chamber, said path of fluid communication being larger than said flow restricting passageway.

3. The quick response valve of claim 2, wherein said valve means defines said flow restricting passageway.

4. A quick response valve comprising:

A. housing means defining, (i) a source port adapted for fluid communication with a source of fluid pressure, (ii) an output port adapted for fluid communication with a controlled pneumatic device, (iii) a source fluid chamber in fluid communication with said source port, (iv) an output fluid chamber in fluid communication with said output port, and (v) an atmospheric vent; and B. valve means defining a flow restricting passageway fluidly interconnecting said source and output chambers, and operative to pneumatically isolate said atmospheric vent from said output chamber when fluid pressure within said output chamber exceeds fluid pressure within said source chamber and to establish a nonrestricting path of fluid communication between said output chamber and atmospheric vent when fluid pressure within said output chamber is less than fluid pressure within said source chamber.

5. In combination:

a source of fluid pressure;

a controlled pneumatic device; and a quick response valve comprising:

A. housing means defining, (i) a source port in fluid communication with said source of fluid pressure, (ii) an output port in fluid communication with said controlled pneumatic device, (iii) a source fluid chamber in fluid communication with said source port, (iv) an output fluid chamber in fluid communication with said output port, and (v) an atmospheric vent; and B. valve means defining a flow restricting passageway fluidly interconnecting said source and output chambers, and operative to pneumatically isolate said atmospheric vent from said output chamber when fluid pressure within said output chamber exceeds fluid pressure within said source chamber and to establish a nonrestricting path of fluid communication between said output chamber and atmospheric vent when fluid pressure within said output chamber is less than fluid pressure within said source chamber.

6. The combination of claim 5, wherein said source of fluid pressure comprises means for actively modulating said controlled pneumatic device as a function of a sensed parameter.

7. The combination of claim 6, wherein said modulating means comprises a vacuum regulator valve.

8. The combination of claim 5, wherein said controlled pneumatic device comprises an exhaust gas recirculation valve.

9. A quick response valve comprising:

A. housing means defining, (i) a source port adapted for fluid communication with an intelligence modulated source of fluid pressure, (ii) a substantially closed source fluid chamber disposed at one end of said housing means and in fluid communication with said source port, (iii) an output port adapted for fluid communication with a controlled pneumatic device and disposed substantially coaxially with said source port, (iv) a substantially closed output fluid chamber disposed at an end of said housing distal said source chamber and in fluid communication with said output port, (v) an atmospheric vent, (vi) an atmospheric chamber disposed intermediate said source and output chambers and in fluid communication with said atmospheric vent, and (vii) means defining an annular valve seat disposed intermediate said output and atmospheric chambers;

B. a valve member disposed within said housing means substantially coaxially with said ports and extending between said source and output fluid chambers, said valve member defining an axially aligned flow restricting passageway fluidly interconnecting said source and output chambers, and an annular valve seal; and C. a diaphragm disposed intermediate said source and atmospheric chambers to resiliently sealingly interconnect said housing and valve member whereby said valve member is selectively axially displaceable between a first position in which said valve seal and seat mate to pneumatically isolate said atmospheric chamber from said output chamber when fluid pressure within said output chamber exceeds fluid pressure within said source chamber, to a second position in which said valve seal and seat coact to establish a relatively large path of fluid communication between said output chamber and atmospheric chamber when fluid pressure within said output chamber is less than fluid pressure within said source chamber.

10. The quick response valve of claim 9, wherein said diaphragm has a characteristic effective area upon which pressurized fluid with said source chamber acts, wherein said valve seal has a characteristic effective area upon which pressurized fluid within said output chamber acts, and wherein said diaphragm effective area exceeds said valve seal effective area.

11. The quick response valve of claim 9, further comprising an air filter disposed intermediate said atmospheric vent and atmospheric chamber.

12. The quick response valve of claim 11, wherein said air filter comprises an annular filter element disposed within said atmospheric chamber.

13. The quick response valve of claim 9, further comprising means operative to limit axial travel of said valve member between said first and second positions.

14. The quick response valve of claim 9, wherein said atmospheric vent has a characteristic effective area and said valve seat and seal define a characteristic maximum effective area therebetween when said valve member is in said second position, said vent area and valve seat-seal area having a fixed ratio within the range of 0.375:1 to 2.250:1.

* * * * *